United States Patent [19]

Edwards et al.

[11] Patent Number: 4,574,023
[45] Date of Patent: Mar. 4, 1986

[54] APPARATUS AND METHOD FOR APPLYING SLEEVES TO PIPE

[75] Inventors: Neil A. Edwards, Redwood City; James C. Holmes, San Francisco; Denis I. Wales, Millbrae, all of Calif.

[73] Assignee: Raychem Corporation, Menlo Park, Calif.

[21] Appl. No.: 574,752

[22] Filed: Jan. 26, 1984

[51] Int. Cl.[4] .................................................. B65H 81/00
[52] U.S. Cl. ...................................... 156/187; 156/392; 156/443
[58] Field of Search .............................. 156/187–188, 156/425, 428, 429, 443, 391, 392

[56] References Cited

U.S. PATENT DOCUMENTS

| Re. 22,591 | 1/1945 | Pfohl et al. | 242/11 |
|---|---|---|---|
| 1,883,401 | 10/1932 | Rolfs et al. | |
| 2,036,887 | 4/1936 | Rolfs et al. | 242/11 |
| 2,057,060 | 10/1936 | Schantz | 216/29 |
| 2,057,061 | 10/1936 | Eggerss | 216/29 |
| 2,070,925 | 2/1937 | Rolfs et al. | 242/11 |
| 3,374,615 | 3/1968 | Evanicsko | 156/425 X |
| 3,470,057 | 9/1969 | Stuart, Jr. et al. | |
| 3,547,731 | 12/1970 | Stuart, Jr. et al. | |
| 3,789,594 | 2/1974 | Rees | |
| 3,819,450 | 6/1974 | Kunz | 156/425 |
| 3,822,167 | 7/1974 | Diola | 156/443 |
| 4,058,427 | 8/1977 | Wilson | |
| 4,061,513 | 12/1977 | Danielson | |
| 4,069,088 | 1/1978 | Cottam | |
| 4,075,053 | 2/1978 | Adams | |
| 4,103,472 | 8/1978 | Heringer | |
| 4,113,545 | 9/1978 | Stuart et al. | 156/428 X |
| 4,145,243 | 3/1979 | Cottam | |
| 4,155,798 | 5/1979 | Becker | |
| 4,174,246 | 11/1979 | Ralston | |
| 4,322,262 | 3/1982 | Cottam | 156/425 X |
| 4,338,153 | 7/1982 | Zimmerman | 156/391 |
| 4,372,796 | 2/1983 | Greuel, Jr. | |

OTHER PUBLICATIONS

Midwestern Jointster; Midwestern Manufacturing Company Joint Wrapping Machine.
Article on "Speedy Link-Up".

Primary Examiner—David Simmons
Attorney, Agent, or Firm—Edith A. Rice; James G. Passé; Herbert G. Burkard

[57] ABSTRACT

An apparatus for applying a sleeve on a pipe comprises a dispenser for wrapping material and guides which define the path followed by the dispenser around the pipe. The guides are held on the pipe so that they are immovable as the sleeve is formed.

15 Claims, 4 Drawing Figures

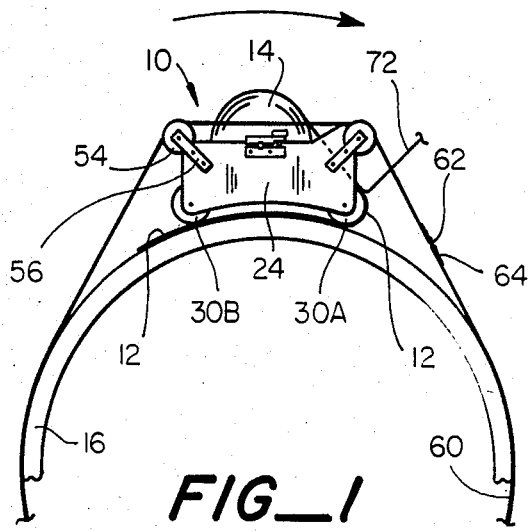
FIG_1
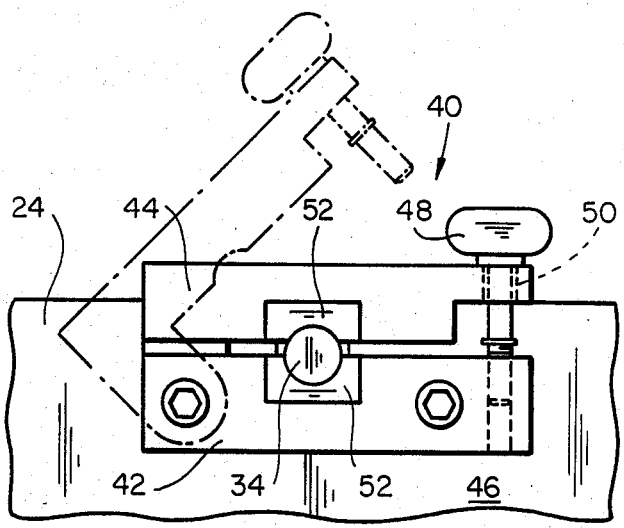
FIG_3
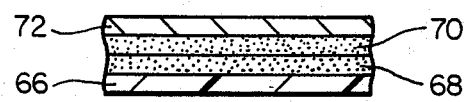
FIG_4

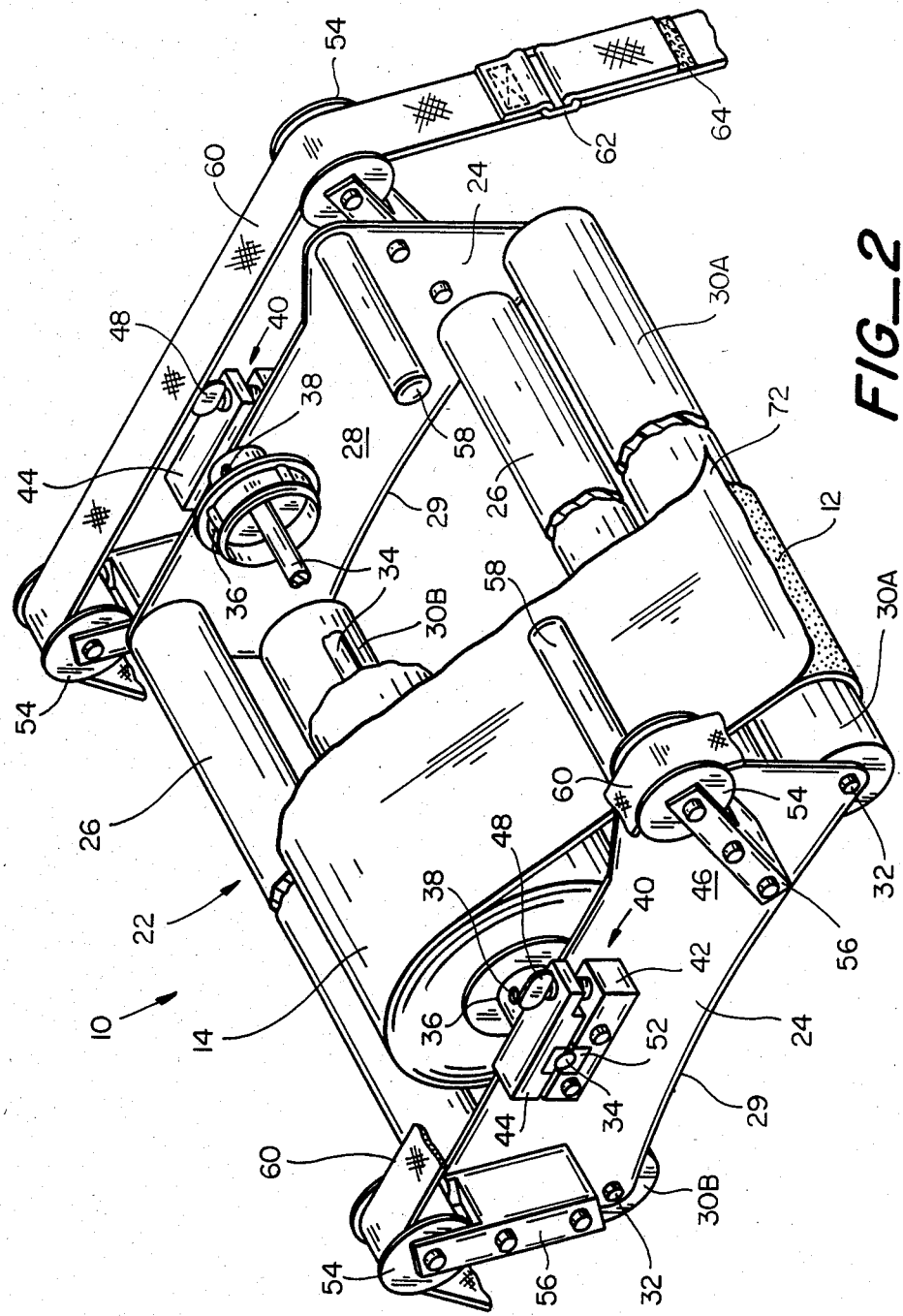
FIG_2

APPARATUS AND METHOD FOR APPLYING SLEEVES TO PIPE

The present invention is directed to an apparatus and method for applying sleeves to pipe.

Pipelines are generally used to transport oil from an oil well to the refinery. The size of pipelines vary with a number of smaller diameter pipes feeding into large diameter pipes called flow lines for transporting the oil to the refinery. Flow lines typically have a diameter in the range of about 14 to about 48 inches. Some of these large diameter pipelines are buried usually for environmental or safety reasons. The pipes of the pipelines are generally metal and are subject to corrosion when they are in contact with soil. This effect can be accelerated if the pipe is at elevated temperatures. Typically, buried pipelines are at ambient temperature or at elevated temperatures up to about 120° C. depending on the temperature of the oil flowing through the pipeline. To prevent corrosion of the pipes, they are generally coated, in one way or another, with a corrosion protective coating.

When such pipelines are installed in desert locations, the soil in which the pipelines are buried has been found to be very reactive. Such soils can contain high concentrations of calcium, magnesium, sodium, potassium and/or chloride ions, leading to chemical attack of the protective coating.

Moreover, in some desert locations, the water table varies seasonally and with the tides, alternately covering and uncovering the pipe. This wet/dry cycle creates tremendous stresses on the coatings as the soil dries. The volume of the soil can change by 12% during the drying out process. The swelling and shrinkage of the soil can cause axial pipe oscillation which can result in ripping the coating off the pipe. Further, the alternating wet/dry cycle is similar to the cycle in the splash zone of off shore oil platforms, where the alternating wet/dry soil makes the corrosion rate increase dramatically.

Because of these extreme conditions, the original factory applied protective coatings fail after 5 to 10 years.

To repair the coating, it is necessary to dig out the pipeline, apply a repair coating, and then back fill, section by section. The repair coating is subject to the same stresses to which the original coating is subjected, but of course does not have the benefits of factory installation. The repair coating must be installed with unskilled labor in extremely difficult conditions; blowing sand, temperatures during the day in excess of 120° F. and at night below freezing, while oil continues to flow through the pipeline. Attempts have been made to apply a repair coating using a cold applied tape with a rock guard covering in a spiral configuration by hand. This tape is mastic backed and applied in a 6 to 9 inch wide spiral. However, it often fails in about six months due to a combination of soil stress and the environment.

It is believed that a stiffer, more heat resistant wrapping material than the rock guard tape would perform better as a repair coating. However, it is more difficult to apply such a wrapping material to the pipeline. It is important to avoid trapping air beneath the wrapping material. It is important to avoid axial slippage of the wrapping material as it is wrapped around the pipe, because this can result in undesirable overlap at the edges which can result in trapping of air, unprotected areas, gaps at the edges, and misalignment. All of these problems can lead to destruction of the pipe and the protective coating because of soil stress and corrosion.

In view of these problems, there is a need for an effective, efficient, and easy method for applying a sleeve to a pipe in the field under extremely hostile conditions.

SUMMARY

The present invention satisfies this need. An apparatus for wrapping material on a cylindrical substrate such as a pipe to form a sleeve according to the present invention comprises at least one guide, and preferably a pair of guides, for placement around the circumference of the pipe. The apparatus includes holding means for securely holding each guide in place around the pipe so that the guides are spaced apart from each other and each guide is in a plane perpendicular to the longitudinal axis of the pipe. In addition, each guide is immovable axially on the pipe and is immovable circumferentially around the pipe.

The apparatus includes a wrapping material dispenser that comprises means for supporting a roll of the wrapping material so that the wrapping material can be dispensed from the roll. The dispenser also includes at least one roller for pressing dispensed wrapping material against the pipe and tracking means for tracking the guides around the pipe. Because of the immovable guides and the tracking means, the wrapping material can be wrapped around the pipe to provide a sleeve where any overlapping portions of the sleeve are substantially coincident and perfectly aligned. No axial or circumferential slippage occurs.

Preferably the guides pass over the tracking means so that the guides hold the dispenser firmly against the dispensed wrapping material. For example, the tracking means can be pulleys with the guides being belts placed over the pulleys.

By the term "immovable", there is meant that the guide as a whole does not move; as the dispenser is moved with the guides over the tracking means there is some temporary distortion of portions of each guide.

In a method according to the present invention, the guides are placed around the circumference of the pipe with the guides parallel to each other and spaced apart. The guides are secured to the pipe so that the guides are in a plane perpendicular to the longitudinal axis of the pipe and the guides are immovable axially and circumferentially. The dispenser is moved around the circumference of the pipe with the tracking means tracking the guides. Wrapping material is dispensed by the dispenser, and the dispensed material is pressed against the pipe by the rollers. Then, in the case of a heat recoverable wrapping material, the pressed wrapping material is heated to complete the sleeve.

To protect a length of pipe, sleeves are placed side-by-side on the pipe using this method.

This apparatus and method have significant advantages. Contamination by sand and other contaminants is avoided. Entrapment of air in an overlap region is minimized. There is no axial or circumferential slippage of the sleeve so unprotected areas and entrapment of air are minimized. Moreover, the apparatus and method are easy to use, and the apparatus is simple, lightweight, and durable.

DRAWINGS

These and other features, aspects, and advantages of the present invention will become better understood with reference to the following description, appended claims, and accompanying drawings where:

FIG. 1 is an end elevation view of an apparatus according to the present invention being used for applying wrapping material to a pipe;

FIG. 2 is a perspective view of the apparatus of FIG. 1;

FIG. 3 is a side elevation view of the mechanism of FIG. 1 for holding a roll of wrapping material in the apparatus of FIG. 1; and FIG. 4 is a sectional view of a portion of a roll of wrapping material showing the different layers of the wrapping material.

DESCRIPTION

With reference to FIG. 1, an apparatus 10 according to the present invention can be used for wrapping wrapping material 12 dispensed from a roll 14 of wrapping material around a pipe 16 to form a sleeve on the pipe. The apparatus 10 includes a dispenser 22 having two parallel, upstanding, spaced apart side plates 24 held in fixed relationship to each other by a pair of rigid pillar tubes 26 welded to the interior surfaces 28 of the side plates 24. The bottom 29 of each side plate has an arcuate curvature to generally match the curvature of the exterior of the pipe 16.

The dispenser 22 includes a pair of rollers 30, a forward roller 30A at the forward end and one rear roller 30B at the rear end of the dispenser. The rollers 30 are mounted on axles 32, which are supported at their ends by the side plates 24. As shown in FIGS. 1 and 2, the rollers used to press wrapping material 12 against the pipe 16. Two rollers 30 are provided to prevent sliding of the dispenser 22 as it moves around the circumference of the pipe 16. The rollers 30 can be formed of a material that is sufficiently compliant to compensate for irregularities in the surface of the pipe 16, while at the same time, is sufficiently hard to press wrapping material against the pipe and avoid any air being trapped between the wrapping material and the pipe. The rollers can be made from a hard rubber such as ethylene propylene rubber. The rollers can have a diameter of from about 1 to 4 inches, and preferably about 2½ inches.

The dispenser 22 includes a spindle 34 provided with a pair of hubs 36 slidable on the spindle 34 to accommodate rolls 14 of variable length. Each hub 36 has a set screw 38 for holding the hub in a selected location on the spindle 34. The spindle 34 rotates as wrapping material is pulled from the roll 14.

Each end of the spindle 34 is held in a braking clamp 40 that comprises a clamp base 42 and a clamp arm 44. As shown in FIGS. 2 and 3, the braking clamps 40 are mounted on the exterior surfaces 46 of the side plates 24. The clamp arms 44 are pivotally mounted while the clamp bases 42 are fixed. Each end of the spindle 34 is held clamped between a clamp base 42 and its corresponding clamp arm 44. The base 42 and arm 44 are held together by a wing nut 48 that extends through a hole 50 in the clamp arm 44 and is threaded into the clamp base 42. Both the clamp base 42 and clamp arm 44 are provided with a nylon insert 52 adjacent to the spindle 34 to reduce the resistance against rotation of the spindle 34. In use, the wing nut 48 is tightened an amount sufficient to provide resistance to rotation of the spindle 34 to provide tension on the wrapping material 12 as it is removed from the roll 14.

The dispenser 22 includes a spindle 34 and four pulleys 54 mounted at each upper corner of the dispenser 22. Each pulley 54 is rotatably supported by a mounting bracket 56 bolted to the exterior surface 46 of one of the side plates 24.

Preferably the side plates 24 are at least 17 inches apart so that a wide roll of wrapping material can be accommodated. Generally the side plates 24 are at least 30 inches apart and up to about 50 inches apart depending on the width of the wrapping material used.

A pair of handles 58 are provided at the forward end of the dispenser 22, the handles 58 being mounted on the interior surface 28 at the top forward corner of each of the side plates 24. The handles 58 are used for pushing or pulling the dispenser 22 around the exterior of the pipe 16.

The path that the dispenser 22 follows around the pipe is determined by a pair of guides 60. The guides 60 can be formed from flexible, substantially non-stretchable material such as the nylon belting used for seatbelts. Each guide 60 includes means for holding the guide firmly around the circumference of the pipe 16. The holding means can be a buckle 62 that allows an end of the guid 60 to be doubled back on itself and Velcro TM self-adhering synthetic material 64 on the adjacent surfaces of the belt to hold the doubled backed portion of the belt against the exterior surface of the belt.

As shown in FIGS. 1 and 2, as the guides 60 are wrapped around the pipe 16 they are placed over the pulleys 54, thereby holding the dispenser 22 firmly against the pipe. As the dispenser is moved around the pipe 16, the pulleys 54 track the guides 60 thereby insuring the dispenser 22 moves in a selected path. The use of two pulleys 54 on each side of the dispenser 22 makes certain that the dispenser 22 does not become tilted or cocked relative to the longitudinal axis of the pipe 16.

The guides 60 can be substantially any length. Generally they are sufficiently long to be used with a pipe at least 20 inches in diameter and can be made sufficiently long to be used with pipe as large as 100 inches in diameter. The guides 60 can be sufficiently short to be used with pipe as small as 2 inches in diameter.

Any type of wrapping material 12 can be used with the apparatus 10, including wrapping materials requiring heating after installation to be effective, as well as those that require no heating. A preferred wrapping material is shown in FIG. 4. and comprises four layers, a heat recoverable polymeric sheet 66, a hot melt adhesive 68 on the sheet 66, a curable polymeric adhesive 70 on the hot melt adhesive 68, and an exterior layer of release paper 72 which prevents the wrapping material from sticking to itself on the roll 14.

The hot melt adhesive can be, for example, a polyamide or ethylene/vinyl acetate copolymer based adhesive composition containing a polyhydroxy compound or a hydrazine derivative to improve its cathodic disbonding properties. The curable adhesive can be, for example, an epoxy or acrylic composition.

To use the apparatus 10 to apply sleeves, a buried pipeline is uncovered leaving the pipeline in a trench. A roll 14 of the wrapping material 12 is placed on the spindle 34. The holding clamp 40 is closed to provide sufficient braking force on the spindle 34 so that the wrapping material 12 is under slight tension as it is pulled from the roll 14. The dispenser 22 is positioned on the exterior surface of the pipe 16 and the guides 60 are placed over the pulleys 54 and buckled tight. The guides are placed so that they are in a plane perpendicular to the longitudinal axis of the pipe. The guides are immovable axially on the pipe and immovable circumferentially around the pipe. Thus, the spindle 34, roll 14 of wrapping material, and rollers 30 are all parallel to the longitudinal axis of the pipe 16. As shown in FIG. 1, wrapping material 12 is pulled from the roll 14, and the release paper 72 is pulled away from the the wrapping material 12 which is then placed under the forward roller 30A and then the rear roller 30B. Thus, the curable polymer 70 is against the exterior of the pipe and the heat recoverable tape 66 is on the exterior layer.

The dispenser 22 is pushed with the handles 58 around the exterior of the pipe following the guides 60 leaving a layer of wrapping material 12 on the pipe. This is continued until the wrapping material overlaps itself, at which point the wrapping material is cut and the overlapping wrapping material is held together. This can be effected by using pressure sensitive or hot melt adhesive on the wrapping material. Alternatively, a temporary or permanent patch is used.

Because of the guides, any overlapping wrapping material is substantially aligned and the wrapping material does not follow a spiral pattern. Further, because of the guides, no axial slippage of the dispenser 22 or the wrapping material 12 occurs during application of the wrapping material.

After a sleeve is formed according to this method, a second sleeve can be applied to the pipe next to the installed sleeve, with the second sleeve slightly overlapping the already installed sleeve. By repeatedly placing sleeves on a pipeline, the entire pipeline can be environmentally protected while the pipeline remains in operation.

The apparatus and method of the present invention have significant advantages. Sleeves can be placed on a pipeline, even while the pipeline remains in use, and even in the middle of pipelines of length greater than one mile. Alignment with the ends of the pipe are not required; the guides can be more than ¼ mile from the ends of a pipeline. The apparatus is inexpensive, lightweight, durable, and easy to use by semi-skilled labor. Only two workers are required to operate the apparatus and apply sleeves. The apparatus and method can be used for substantially any pipe size and sleeve size and apply sleeves having substantially no trapped air or wrinkles. Sleeve after sleeve can be uniformly applied.

Although the present invention has been described in considerable detail with reference to certain preferred versions thereof, other versions are possible. For example, more than four or fewer than four pulleys can be used. In some applications, only one roller is required while in other applications more than two rollers can be required. In addition, although it is preferred to use two guides, more than two guides or only one guide can be used in some applications. Also, the method and application are not limited to applying sleeves to pipelines, but can be used with other generally cylindrical substrates. Therefore, the spirit and scope of the appended claims should not necessarily be limited to the description of the preferred versions contained herein.

What is claimed is:

1. An apparatus for wrapping wrapping material on an elongated cylindrical substrate to form a sleeve on the substrate, the apparatus comprising:
   (a) at least one guide for placement around the circumference of the substrate and holding means for securely holding the guide in place around the substrate so that (i) the guide is in plane perpendicular to the longitudinal axis of the substrate, (ii) the guide is immovable axially on the substrate, and (iii) the guide is immovable circumferentially around the substrate; and
   (b) a wrapping material dispenser comprising (i) means for supporting a roll of the wrapping material so that the wrapping material can be dispensed from the roll, (ii) at least one roller for pressing dispensed wrapping material against the substrate, and (iii) tracking means for tracking the guide around the substrate for dispensing wrapping material around the pipe to provide a sleeve, any overlapping portions of the sleeve being substantially coincident.

2. The apparatus of claim 1 comprising a pair of such guides.

3. The apparatus of claim 1 comprising two rollers for pressing dispensed wrapping material against the substrate.

4. The apparatus of claim 2 in which the guides are sized to pass over the tracking means so that the guides hold the dispenser firmly against dispensed wrapping material.

5. The apparatus of claim 4 in which the tracking means are pulleys and the guides are flexible belts.

6. A method for forming a sleeve on an elongated cylindrical substrate comprising the steps of:
   (a) placing at least one guide around the circumferential periphery of the substrate;
   (b) selecting a dispenser comprising (i) means for supporting a roll of wrapping material so that the wrapping material can be dispensed from the roll, (ii) at least one roller for pressing dispensed wrapping material against the substrate, and (iii) tracking means for tracking the guide around the substrate;
   (c) securing the guide to the substrate so that the guide is in a plane perpendicular to the longitudinal axis of the substrate and so the guide is (i) immovable axially on the substrate and (ii) immovable circumferentially around the substrate; and
   (d) moving the dispenser around the circumference of the substrate with the tracking means tracking the guide to provide a sleeve, any overlapping portions of the sleeve being substantially coincident.

7. A method for forming a sleeve on an elongated cylindrical substrate comprising the steps of:
   (a) placing a pair of guides around the circumferential periphery of the substrate with the guides parallel to each other and spaced apart;
   (b) selecting a dispenser comprising (i) means for supporting roll of wrapping material so that the wrapping material can be dispensed from the roll, (ii) at least one roller for pressing dispensed wrapping material against the substrate, and (iii) tracking means for tracking the guide around the substrate;
   (c) securing the guides to the substrate so that the guides are in a plane perpendicular to the longitudinal axis of the substrate and so the guides are (i) immovable axially on the substrate and (ii) immovable circumferentially around the substrate; and
   (d) moving the dispenser around the circumference of the substrate with the tracking means tracking the guides to provide a sleeve, any overlapping portions of the sleeve being substantially coincident.

8. The method of claim 6 in which the wrapping material is heat recoverable and including the additional step of heating the wrapping material after it is wrapped around the substrate.

9. The method of claim 6 in which the step of securing comprises securing the guide over the tracking means so that the guide holds the dispenser firmly against dispensed wrapping material.

10. The method of claim 6 in which the roll is at least 17 inches long.

11. The method of claim 6 in which the substrate is at least 20 inches in diameter.

12. The method of claim 7 in which the guides are placed around the substrate spaced apart from the ends of the substrate.

13. The method of claim 6 in which the substrate has a fluid flowing therethrough.

14. The method of claim 7 in which the substrate is a pipeline having a length greater than 1 mile.

15. The method of claim 14 in which the substrate is a pipeline having a length greater than 1 mile and the guides are at least ¼ mile from both ends of the pipeline.

* * * * *